(No Model.)
J. D. IHLDER.
ELECTRIC ELEVATOR MOTOR.
No. 514,078. Patented Feb. 6, 1894.
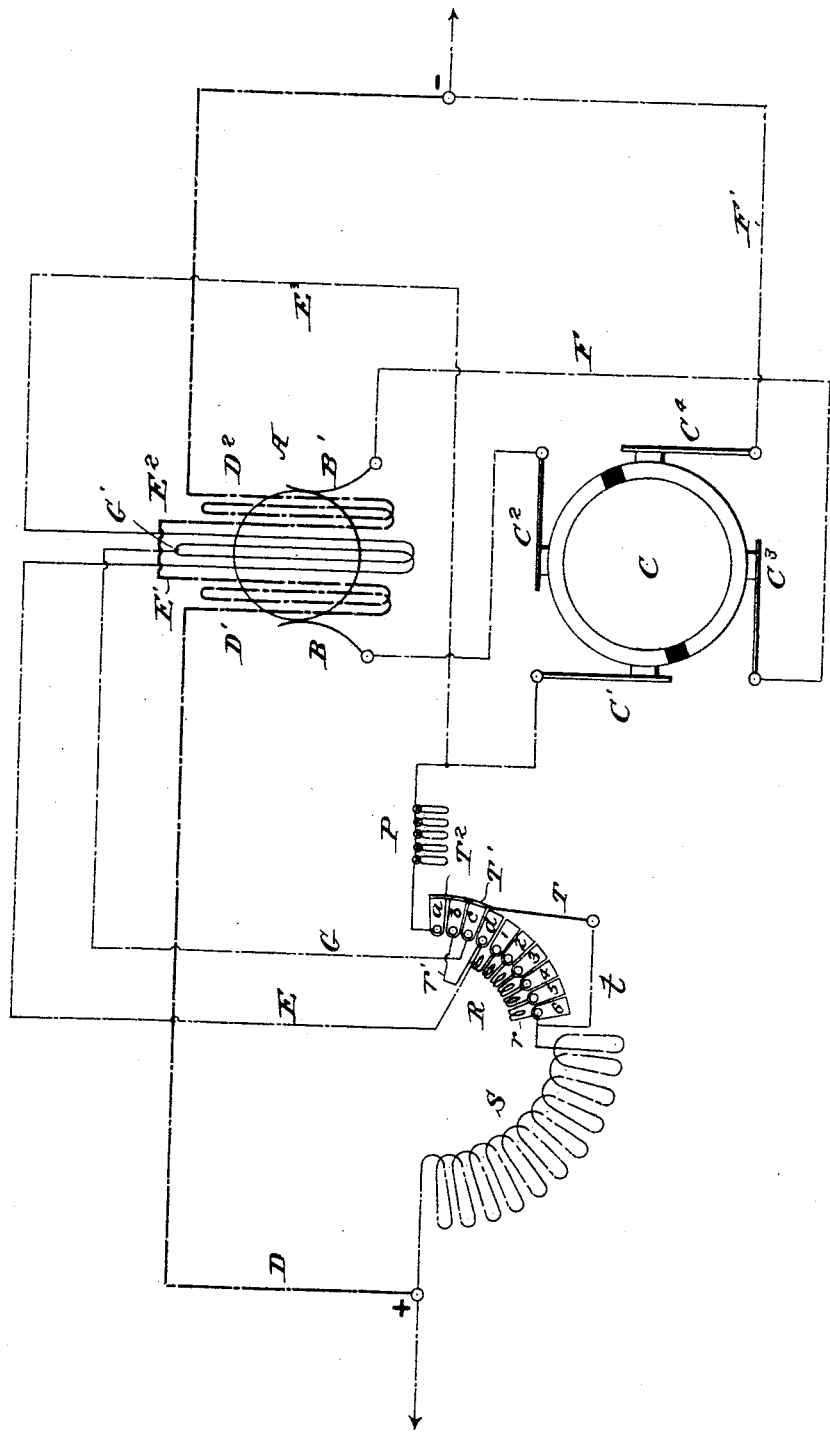
Witnesses
J. G. Hinkel
Alex N. Dobson
Inventor
John D. Ihlder.
by Foster Freeman
Attorneys

UNITED STATES PATENT OFFICE.

JOHN D. IHLDER, OF YONKERS, ASSIGNOR TO THE OTIS BROTHERS & COMPANY, OF NEW YORK, N. Y.

ELECTRIC ELEVATOR-MOTOR.

SPECIFICATION forming part of Letters Patent No. 514,078, dated February 6, 1894.

Application filed September 29, 1893. Serial No. 486,808. (No model.)

*To all whom it may concern:*

Be it known that I, JOHN D. IHLDER, a citizen of the United States, residing in Yonkers, Westchester county, and State of New York, have invented certain new and useful Improvements in Electric Elevator-Motors, of which the following is a specification.

My invention relates to means for starting and operating electric motors, and while the invention may be employed in many and various connections, it has special reference to the employment of electric motors in operating elevators and the like, and the object is to provide means whereby the motor may be started under the best conditions to attain the greatest force, and may be operated under similar conditions, and controlled automatically, so that the elevator or other appliance connected thereto will be satisfactorily operated under all conditions, and to these ends my invention consists in the features of construction and arrangement, having the mode of operation substantially as hereinafter more particularly pointed out.

In the accompanying drawing, the figure is a schematic representation of a motor and attachments, and arrangement of circuits embodying my invention, sufficient to enable those skilled in the art to understand the same.

In the use of what are generally termed "compound" electric motors, especially in the operation of elevators and the like, it is well known that they have many advantages, and are still open to some objections when used as an ordinary compound wound electric motor, and the objects of my invention are to arrange the circuits of such motor in connection with suitable devices, whereby the motor may be operated in the most advantageous and satisfactory manner.

It is desirable to utilize the compound wound electric motor in starting the load, and especially in connection with elevators which have to be started and stopped at frequent intervals, and after the motor has started with its load, it is desirable to change its circuits and connections so that it shall operate practically as a shunt wound motor, as such motor is found to be the best adapted for this purpose, running at a uniform rate of speed, besides being practically self-regulating and economical.

In carrying out my invention, I preferably arrange the circuits substantially as indicated in the accompanying drawing, so that the mode of operation, at least, shall be substantially as described, and in the drawing A, represents the armature of the motor, B, B', the brushes of the motor, the field coils being indicated as wound on the motor in the manner as hereinafter described, while C is a circuit reverser for the armature, the parts being shown displayed for convenience of illustration. The characters plus (+) and minus (−) represent the lead or main lines of the electric circuit supplying current to the motor, and the conductor D shown in the heavy lines, including the convolutions D', $D^2$, represent the long shunt field magnet coils of the compound wound motor.

The armature circuit, which normally includes the series field magnet coils, is provided with an auxiliary resistance R, which is preferably controlled by an electro-magnetic device S, which is included in the armature circuit, and which controls a contact arm T, which bears on the various contact plates of the auxiliary resistance R. One end of the auxiliary resistance, as the block 6, is connected to the coil S and to the next succeeding block 5, suitable resistance $r$, being interposed between the blocks, and the remaining numbered blocks of the auxiliary resistance are similarly connected by suitable resistances.

The block $d$, is connected by a conductor E, with the series field magnet coils E', $E^2$ of the motor, and thence leading from said coils, by the conductor $E^3$, the circuit passes to the contact arm C' of the circuit-reverser, thence to the contact arm $C^2$, to the brush B of the armature, through the coils thereof to the brush B', thence by the conductor F, to the contact arm $C^3$, and out by the contact arm $C^4$, by conductor F', to line. Of course, it will be understood that if the position of the current reverser C, is changed, the circuit will be the same, except that the current will pass through the armature coils in the opposite direction, in the manner well understood.

The contact block $c$ of the auxiliary resistance is shown as connected by the conductor G, with the central portion G' of the series field magnet coils of the motor, so that only one-half of those coils are included in the circuit of this contact block.

The contact block $b$ is shown as connected with the contact block $d$ of the auxiliary resistance, by a conductor $r'$, of practically no resistance. The contact block $a$ is connected directly with the contact arm C', and may include an adjustable resistance P, and it will be seen that this resistance is arranged in the armature circuit in parallel or multiple arc with the series field magnet coils, or a portion thereof.

The contact arm T, which is connected by conductor $t$, with the armature circuit as indicated, and preferably with the terminal of the electro magnetic coil S, is provided with two blocks T', T², insulated from each other, the block T² being preferably arranged so as to make contact with two adjacent contact blocks of the auxiliary resistance. But it will be understood that other mechanical devices may be substituted for those above indicated, by those skilled in the art, this being given as illustrative only.

With this arrangement of circuits, it will be seen that when the circuit is closed through the motor, by any well-known switch device, in the usual way, a portion of the current passes through the conductor D, including the shunt field magnet coils of the motor, while another portion passes through the coils of the electro magnetic device S, energizing the same and operating to cause the contact arm T to assume such a position that it will bear on the contact block 6, and include the auxiliary resistance in the armature circuit, and thereby prevent too great a flow of current through the armature on starting, and it will be observed also that the current, after passing through the resistance, also passes through the conductor E, including the series field magnet coils of the motor, thereby causing the motor to operate purely as a compound wound motor, for the purpose of getting the greatest torque in starting and overcoming the inertia of the load. As soon, however, as the armature of the motor begins to operate, the counter electro-motive force produced thereby tends to reduce the amount of current flowing through the armature, weakening the magnetic effect of the coils of the electro magnetic device S, and the auxiliary resistances are gradually cut out of circuit, the contact arm passing the successive contact plates in a manner well understood. When the contact arm T' reaches the contact block 2, the insulated portion T² of the contact arm, would short-circuit resistance blocks 1 and $d$, and the current would then flow through both coils E', E² of the series field magnet coils. When the contact block $t'$, reaches contact block 1, the resistance $r$, between blocks 1 and $d$, would be included in the circuit, and the insulated contact block T² would short-circuit blocks $d$ and $c$, practically cutting out of circuit the section E' of the field magnet coils, and the current would pass through the conductor G, and the section E², of the field magnet coils. When the contact T', reaches the block $c$, the current would pass through the conductor G, through the coils E², in the same direction as before, while a portion of it would pass through the coils E' of the series field magnet coil, but in an opposite direction, and thence returning by the conductor E to the block $d$ and conductor $r'$, to the block B, through the contact T², to the block $a$ and thence pass through the parallel circuit P, to the armature. In this condition, it will be observed that part of the field magnet coils in series with the armature, are energized in one direction, and part in another, so that they are in opposition to each other, and by adjusting the parallel resistance P, the amount of current flowing in each circuit can readily be determined, or if perchance, the resistance P, is entirely cut out, the two sections of the series field magnet coils would be energized in opposition to each other, but under no circumstances are all the series field magnet coils short-circuited or cut out of circuit.

It will thus be seen that by arranging the circuits as above described, various conditions of operation of the motor can be automatically accomplished, and by properly adjusting the relative relations of the circuits, the motor may be adapted to operate practically as an ordinary shunt motor for running under normal conditions, which is found to be the most satisfactory condition for a motor, especially when applied to running elevators and the like. Moreover, as the series field magnet coils are never entirely cut out of circuit, there is no danger of sparking, and as the position of the contact arm 10 is controlled by the electro magnetic device S, in the armature circuit, its operation is automatic and self-regulating.

What I claim is—

1. A compound wound electric motor, having a shunt field magnet circuit connected to the terminals of the supply circuit, a series field magnet circuit in one or more sections included in the armature circuit, and means for reversing the current in a portion of said series field magnet coils, substantially as described.

2. A compound wound electric motor for elevators, having a shunt including field magnet coils and connected to the terminals of the supply circuit, a series field magnet circuit in one or more sections included in the armature circuit, and means for short-circuiting a portion of the series field magnet coils and then reversing the current in a portion of said series field magnet coils substantially as described.

3. A compound wound electric motor for elevators, having a shunt including field magnet coils and connected to the terminals of the supply circuit, a series field magnet circuit in one or more sections included in the armature circuit and means for short-circuiting a portion of the series field magnet coils and then reversing the current in a portion of said field magnet coils, and resistance devices for adjusting the relations of the circuit between the two sections of the series field magnet coils, substantially as described.

4. A compound wound electric motor for elevators, having a shunt including field magnet coils and connected to the terminals of the supply circuit, a series field magnet circuit in one or more sections included in the armature circuit, an adjustable resistance arranged in parallel with the series field magnet coils, an auxiliary resistance arranged in the armature circuit, and means for controlling the auxiliary resistance and for short-circuiting a portion of the series field magnet coils and reversing the current in a portion of said coils, substantially as described.

5. A compound wound electric motor for elevators, having a shunt including field magnet coils and connected to the terminals of the supply circuit, a series field maget coil in sections included in the armature circuit, an auxiliary resistance also arranged in the armature circuit, an electro magnetic device controlling the said auxiliary resistance and arranged to automatically short-circuit a portion of the series field magnet coils and reverse the current in a portion of the series field magnet coils, substantially as described.

In testimony whereof I have signed my name to this specification in the presence of two subscribing witnesses.

JOHN D. IHLDER.

Witnesses:
JAMES S. FITCH,
FREDERICK E. HUBBELL.